2,910,076
EGG WASHING APPARATUS

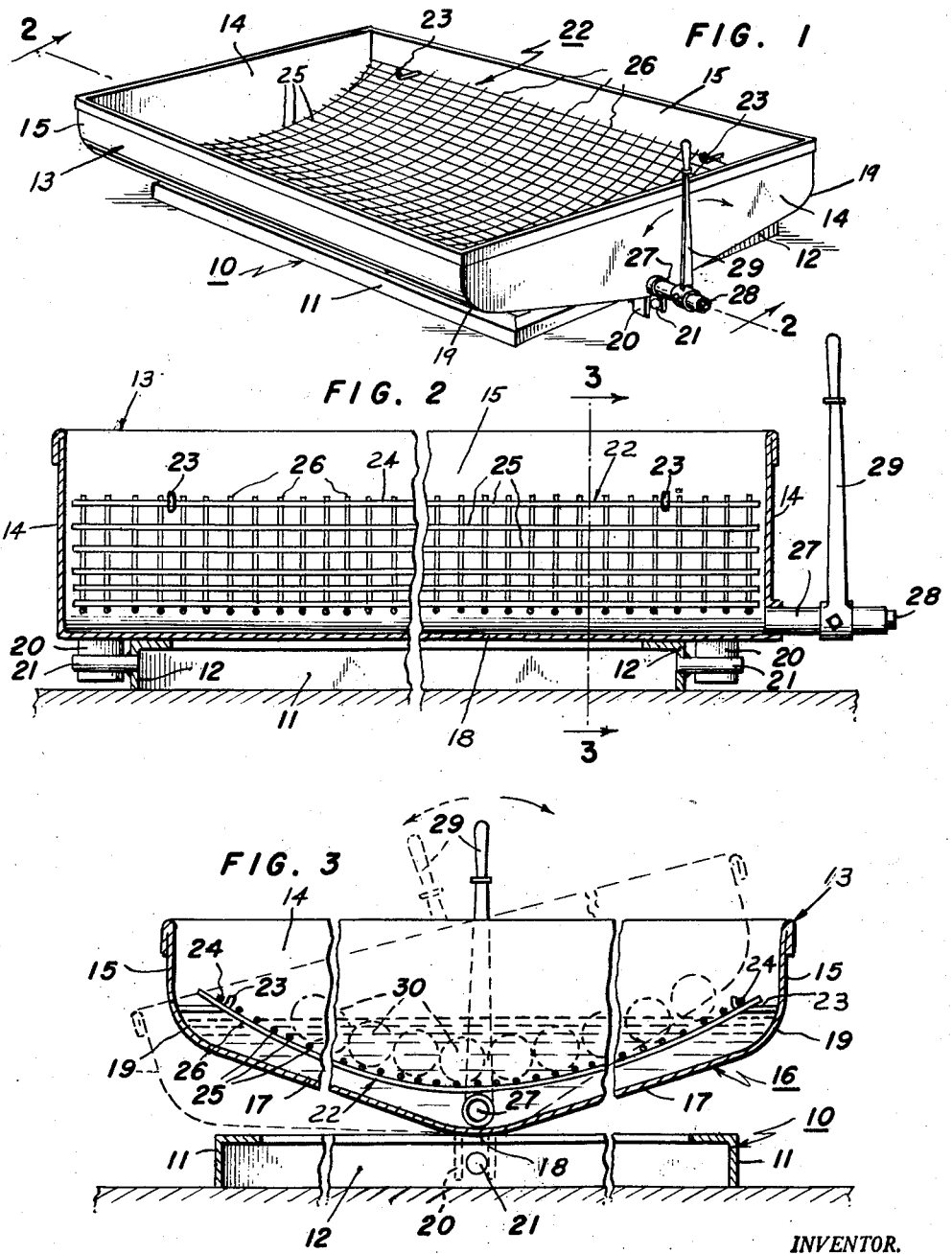
Oct. 27, 1959   A. J. McNETT   2,910,076
EGG WASHING APPARATUS
Filed May 28, 1958
INVENTOR.
Andrew J. Mc Nett
BY
B. P. Fishburne, Jr.
ATTORNEY

Andrew J. McNett, Grapevine, Tex.

Application May 28, 1958, Serial No. 738,493

1 Claim. (Cl. 134—118)

The present invention relates to apparatus for washing eggs.

An important object of the invention is to provide egg washing apparatus for use by poultrymen and the like, which apparatus is highly simplified and compact in construction, easy to use, and adapted to wash a large number of eggs at one time.

A further object of the invention is to provide egg washing apparatus which is very easy to set up and dismantle and which occupies a minimum of space during use or while in storage.

A further object is to provide egg washing apparatus which has a novel and simplified mode of operation, and wherein the eggs are subjected to a combined rolling and rubbing action while water is dashed over the same for thoroughly cleaning the eggs.

A still further object is to provide an egg washing apparatus which, when used properly, will substantially eliminate all breakage of eggs while they are being washed.

Other objects and advantages of the invention will become apparent during the course of the following description.

In the accompanying drawings forming a part of this application and in which like numerals are employed to designate like parts throughout the same, Figure 1 is a perspective view of an egg washing apparatus in accordance with the invention.

Figure 2 is a central vertical longitudinal section on an enlarged scale through the apparatus of Figure 1, partly broken away.

Figure 3 is a transverse vertical section taken on line 3—3 of Figure 2.

In the drawings, wherein for the purpose of illustration is shown a preferred embodiment of the invention, the numeral 10 designates a low horizontal rectangular frame, including side and end frame bars 11 and 12 which are preferably L-shaped in cross section and rigidly secured together by welding or the like. The rectangular frame 10 constitutes a support for the remainder of the apparatus, and in use, the frame 10 may be placed upon a table, on the floor, or on any other suitable support of the desired elevation.

Arranged above the frame 10 for rocking movement relative thereto is a relatively shallow rectangular pan or trough 13 having its top entirely open, and including vertical end walls 14, side walls 15 and a bottom wall 16 formed integral with the side walls 15, as shown. The bottom wall 16 of the pan 13 includes portions 17 on opposite sides of the transverse center of the pan which may be formed substantially flat and sloping downwardly from the bottoms of the side walls 15, and converging at the bottom 18 of the pan, which bottom is preferably rounded, as shown in Figure 3, at the transverse center of the pan and throughout its entire length. The bottom wall portions 17 may be formed slightly curved or concave between the bottom 18 and vertical side walls 15, if preferred. The junctures 19 of the side walls 15 and sloping bottom wall portions 17 are preferably rounded as best shown in Figure 3. The end walls 14 extend from the open top of the pan to its rounded bottom 18, as shown, but the vertical side walls 15 extend downwardly only to the rounded junctures 19 of the side walls with the sloping bottom wall portions 17.

The pan 13 and the supporting frame 10 are somewhat elongated longitudinally of the apparatus or between the end walls 14, and the pan and frame may be constructed in any desired lengths to accommodate a greater or lesser number of eggs.

Near its opposite ends and at its transverse center, the bottom wall of the pan 13 has rigidly secured thereto depending downwardly opening bearings 20, for engagement over a pair of horizontal trunnions 21, which are rigidly secured to the end frame bars 12 and projecting outwardly longitudinally thereof at the transverse center of the frame 10. The rounded bottom 18 of the pan 13 engages rockably upon the transverse frame bars 12, and the downwardly opening bearings 20 engage over the trunnions 21 and serve to prevent the pan 13 from sliding transversely on the frame 10 during the rocking of the pan. The pan cannot shift or slide longitudinally upon the frame 10 due to the close relationship of the bearings 20 to the outer sides of the frame bars 12, as shown in Figure 2. The bearings 20 and trunnions 21 thus serve to guide or stabilize the pan during the rocking of the latter and the pan actually rocks upon its rounded bottom 18.

Removably mounted within the pan 13 is a foraminous wire tray or screen 22, also of rectangular form and extending throughout substantially the entire length of the pan 13 between the end walls 14 thereof. The wire screen 22 also extends for substantially the full width of the pan 13, as shown in the drawings, and is bodily supported therein by a plurality of hooks 23, rigidly secured to the pan side walls 15 near the rounded junctures 19 of the side walls with the sloping bottom wall portions 17. The hooks 23 project laterally inwardly of the pan side walls 15 and engage the outermost longitudinal wires 24 of the screen 22 to bodily support the screen at an elevation near and above the bottom wall 16 of the pan. The screen 22 is preferably quite stiff and formed of heavy wire, and the screen is shaped or formed to extend generally parallel to the bottom wall 16 of the pan, as best shown in Figure 3. Under the weight of eggs placed upon the screen 22, the screen will tend to bow and assume the curved shape shown in Figure 3, and the entire screen 22 will be spaced somewhat above the bottom wall of the pan at all times.

The longitudinal and transverse wires 25 and 26 of the screen 22 extend at right angles to each other and are rigidly connected by welding or the like. The rectangular screen openings formed by the crossing of the wires 25 and 26 are preferably about one-half of an inch in length and width, although the size of the screen openings is not critical and may be varied somewhat as found desirable.

One end wall 14 of the pan 13 is provided at its transverse center and at the bottom of the pan with a short drain pipe 27, rigidly secured in registration with an opening formed through the particular end wall 14. The drain pipe 27 is adapted to receive a removable plug or stopper 28 in its outer end as shown. An upstanding handle 29 may be rigidly mounted upon the drain pipe 27 to facilitate rocking the pan transversely upon the frame 10, but the handle is optional and may be omitted if preferred.

In use, the eggs 30 to be washed are placed upon the wire screen 22 so that the eggs cover the major portion of the wire screen from end-to-end and side-to-side thereof. A large number of eggs may be washed by the apparatus during one operation, and the number of eggs which the apparatus may wash depends of course upon the size of the pan 13 and frame 10, which size may be varied as desired in the manufacture of the apparatus. In this connection, I contemplate making the apparatus large enough for use by poultrymen for washing relatively large numbers of eggs during one operation. The egg washing apparatus may be manufactured in smaller sizes for accommodating a relatively smaller number of eggs, if desired.

A single layer only of the eggs 30 is placed upon the screen 22, and the eggs may contact one another within the apparatus, but the eggs are not stacked one upon another within the apparatus. After the eggs are placed upon the screen 22, and the stopper 28 is placed within the drain pipe 27, sufficient water is introduced into the pan 13 to cover or substantially cover all of the eggs, and the operator now begins to rock the pan 13 transversely upon the frame 10 by the use of the handle 29, or by merely grasping one side of the pan 13 and rocking it.

When this is done, all of the eggs 30 will roll for a limited extent back and forth upon the screen 22 toward the side walls 15 of the pan, and during such movement, the eggs will rub or frictionally contact one another and the water within the pan 13 will be continuously dashed over the eggs and around and between them in a back and forth manner as the pan 13 rocks or oscillates. After the pan has been rocked for a relatively short time, the eggs will be thoroughly washed and cleaned and the rocking of the pan is then stopped, and the stopper 28 is removed from the drain pipe 27 to allow all of the water and dirt to drain out of the pan. The spacing of the wire screen 22 above the bottom wall 16 of the pan allows the dirt to settle to the bottom of the pan, and the sloping wall portions 17 cause the dirt to gravitate toward the rounded bottom 18, so that the dirt will readily flow with the water through the drain pipe 27. The sloping bottom wall of the pan 13 and the corresponding shape of the screen 22 facilitates the use of a minimum amount of water within the pan for covering the eggs and washing them.

After the eggs have been washed as above-described, the stopper 28 may be replaced in the drain pipe 27 and rinse water may now be introduced into the pan 13 to again cover the eggs and the pan may again be rocked back and forth transversely to rinse the eggs. The stopper 28 is again removed and the rinse water is drained from the pan, and any desired number of rinsing operations deemed necessary may be repeated. After the final rinsing of the eggs, the stopper 28 is removed again from the drain pipe and the rinse water is allowed to drain from the pan 13, after which the eggs may be left standing upon the screen 22 until they are dry. After the eggs are dry, they are ready for removal from the apparatus for packaging or storage.

The wire screen 22 is readily removable from the pan 13 by merely lifting it from the hooks 23, and the entire pan 13 is bodily removable from the frame 10 by merely lifting it from the frame and removing the bearings 20 from the trunnions 21. Because of this arrangement, the pan 13 and the frame 10 may be readily stored in a minimum of space at any out-of-the-way place selected by the poultryman. Likewise, the apparatus may be set up for use at any desired location with a minimum of effort and without the need for any tools or separate attaching elements whatsoever.

A further convenient feature of the apparatus resides in the fact that the frame 10 may be used with either side up. That is to say, the frame 10 is reversible from its position shown in the drawings. The trunnions 21 are located at the vertical center of the frame 10 to enable the frame to be inverted, if desired.

The overall depth of the pan 13 relative to the depth of the water within it to substantially cover the eggs is such that the pan may be rocked to the necessary extent without splashing the water out of the pan as the water is dashed back and forth over the eggs. The eggs roll transversely upon the screen 22 for a relatively slight amount, but sufficient to cause the eggs to frictionally rub together about their peripheries and to change their positions somewhat upon the screen.

It is thus seen that I have provided a highly simplified and compact apparatus for thoroughly washing large numbers of eggs in a minimum length of time and with very little manual labor. There is no need in the apparatus for scrubbing brushes, conveyors or other power-driven components, and the eggs are thoroughly cleaned by the combined action of the water dashing over them and the rolling and rubbing together of the eggs when the pan is rocked as above-described. The apparatus embodies a minimum number of parts, and no special skill is required to set up and operate the apparatus.

I have found in actual practice that by the use of my apparatus for washing large numbers of eggs, breakage of the eggs is reduced to an absolute minimum, and this constitutes an important advantage of the apparatus over conventional means used to wash eggs at the present time.

It is to be understood that the form of the invention herewith shown and described is to be taken as a preferred example of the same, and that various changes in the shape, size and arrangement of parts may be resorted to, without departing from the spirit of the invention or the scope of the subjoined claim.

Having thus described my invention, I claim:

Egg washing apparatus comprising a horizontal base, a relatively shallow pan having a greater length than width, said pan having its maximum length and width at its top, said top being permanently open, said pan including substantially vertical ends and sides, said sides continuing downwardly to form a bottom portion, said bottom portion including inclined sheets sloping downwardly toward the transverse center of said bottom portion and a part connecting the lower ends of said sheets, said part being curved in a vertical plane extending transversely of the pan, said part sloping downwardly and forming a rocking element arranged at the transverse center of the pan and engaging the ends of said base and at the transverse centers of said ends, horizontal trunnions mounted upon the ends of the base and arranged beneath the top of the same, pairs of spaced bearing elements secured to the rocking element and disposed at the transverse center of the pan adjacent to its ends and receiving the horizontal trunnions between them, a horizontal outlet pipe secured to one end of the pan at the transverse center of the pan and disposed above and in substantial alignment with the adjacent trunnion when the pan is in the horizontal position, means to close the outlet pipe, an upstanding lever mounted upon the horizontal outlet pipe to turn it upon its longitudinal axis and transversely rock the pan, a foraminous tray mounted within the pan for supporting the eggs, and upwardly facing hooks secured to the sides of the pan and adapted for insertion within the openings of the foraminous tray, said hooks removably supporting the longitudinal edges of the foraminous tray and holding the longitudinal edges at an elevation spaced below the top of the pan and also holding the tray spaced from the bottom of the pan.

References Cited in the file of this patent

UNITED STATES PATENTS

| | | |
|---|---|---|
| 58,642 | Heim | Oct. 9, 1866 |
| 559,933 | Crain | May 12, 1896 |
| 1,611,310 | Grant | Dec. 21, 1926 |
| 1,621,548 | Kuhns | Mar. 22, 1927 |
| 1,693,548 | Corrie | Nov. 27, 1928 |